(12) United States Patent
Boivie et al.

(10) Patent No.: US 11,625,171 B2
(45) Date of Patent: Apr. 11, 2023

(54) HARDWARE SUPPORT FOR MEMORY SAFETY WITH AN OVERFLOW TABLE

(71) Applicant: International Business Machines Corporation, Armonk, NY (US)

(72) Inventors: Richard H. Boivie, Monroe, CT (US); Tong Chen, Yorktown Heights, NY (US); Alper Buyuktosunoglu, White Plains, NY (US); Benjamin P Segal, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/476,779

(22) Filed: Sep. 16, 2021

(65) Prior Publication Data

US 2023/0078428 A1 Mar. 16, 2023

(51) Int. Cl.
*G06F 3/06* (2006.01)
*G06F 9/30* (2018.01)
*G06F 21/52* (2013.01)
*G06F 21/00* (2013.01)
*G06F 9/00* (2006.01)

(52) U.S. Cl.
CPC .......... *G06F 3/0619* (2013.01); *G06F 3/0653* (2013.01); *G06F 3/0679* (2013.01); *G06F 9/3004* (2013.01); *G06F 21/52* (2013.01); *G06F 9/00* (2013.01); *G06F 9/30043* (2013.01); *G06F 21/00* (2013.01); *G06F 2212/1052* (2013.01)

(58) Field of Classification Search
CPC .... G06F 3/0619; G06F 3/0653; G06F 3/0679; G06F 9/3004; G06F 21/52; G06F 9/00; G06F 9/30043; G06F 21/00; G06F 2212/1052
See application file for complete search history.

(56) References Cited

U.S. PATENT DOCUMENTS

| 8,966,080 B2 * | 2/2015 | Akidau | G06F 9/466 709/226 |
| 9,535,613 B2 | 1/2017 | Yazdani et al. | |
| 2020/0409868 A1 | 12/2020 | Durham | |

OTHER PUBLICATIONS

Mel, et al. "The NIST Definition of Cloud Computing". Recommendations of the National Institute of Standards and Technology. Nov. 16, 2015.
Nam, Myoung Jin, et al., "FRAMER: A Tagged-Pointer Capability System with Memory Safety Applications," Proceedings of the 35th Annual Computer Security Applications Conference ASAC '19, ACM, 2019.
Xu, Shengjie, "Efficient Subobject-Granularity Spatial Memory Safety Enforcement with In-Fat Pointer," Thesis, University of Toronto, 2021.

* cited by examiner

*Primary Examiner* — David Yi
*Assistant Examiner* — Dustin B. Fulford
(74) *Attorney, Agent, or Firm* — Jeffrey S. LaBaw, Esq.; McGinn I.P. Law Group, PLLC

(57) ABSTRACT

A method, system and apparatus for protecting from out of bounds memory references, including establishing a threshold number of active objects for examination for an out of bounds memory reference, determining whether a number of active objects for an application exceeds the threshold, and when the number of active objects exceeds the threshold, storing at least part of information about the active objects in an overflow table in a memory.

20 Claims, 18 Drawing Sheets

```
void *malloc(size)
{
    p = allocate space for the new object
    if there are free entries in the Bound Information (BI) table {
        allocate a new entry in the BI table
        store the bounds information for the new object in the new BI table entry  ⟵ 570
        store the index of the new table entry in the index field of pointer p
        store the bounds information for the new object in bi0
        return p        // through r0
    } else {
        store the "all 1's" index in the index field of pointer p
        store the bounds information for the new object in bi0                     ⟵ 572
        // note: bounds info is not stored in memory
        // unless & until p or a pointer derived from p is stored in memory
        return p        // through r0
    }
}
```

FIG. 16

HARDWARE SUPPORT FOR MEMORY SAFETY WITH AN OVERFLOW TABLE

CROSS-REFERENCE TO RELATED APPLICATIONS

The present application is a related Application of U.S. patent application Ser. No. 17/137,666, which was filed on Dec. 30, 2020, and U.S. patent application Ser. No. 17/071,257, which was filed on Oct. 15, 2020, the entire contents of which are incorporated herein by reference.

BACKGROUND

The present invention relates to an embodiment of a method, apparatus, and system for hardware support, and more particularly, but not by way of limitation, relates to a method, apparatus, and system for hardware support for memory safety with an overflow table.

Memory safety bugs such as buffer overflow and use-after-free have been at the root of a wide variety of cyber-security problems for many years.

Programs such as C and C++, which have been used extensively in certain operating systems and other programs, can lead to a plurality of memory safety errors that attackers can exploit with dangerous and intrusive consequences, such as remote code execution or elevation of privilege flaws, etc. For example, by reading out-of-bounds memory, an attacker might be able to get secret values, such as memory addresses, which can bypass protection mechanisms.

Therefore, there is a need to have techniques that can reduce or eliminate memory safety vulnerabilities in an efficient manner.

SUMMARY

In view of the foregoing and other problems, disadvantages, and drawbacks of the aforementioned background art, an exemplary aspect of the disclosed invention provides a method, apparatus, and system for memory safety with an overflow table.

An embodiment includes a method for protecting from out of bounds memory references, including establishing a threshold number of active objects for examination for an out of bounds memory reference, determining whether a number of active objects for an application exceeds the threshold, and when the number of active objects exceeds the threshold, storing at least part of the information about the active objects in an overflow table in a memory.

An embodiment includes a system for protecting from out of bounds memory references, including a memory storing computer instructions, and a processor configured to execute the computer instructions to establish a threshold number of active objects for examination for an out of bounds memory reference, determine whether a number of active objects for an application exceeds the threshold, and when the number of active objects exceeds the threshold, store at least part of information about the active objects in an overflow table in a memory.

Another embodiment includes a computer program product comprising a computer readable storage medium having program instructions embodied therewith, the program instructions readable and executable by a computer to cause the computer to perform a method for protecting from out of bounds memory references, including establishing a threshold number of active objects for examination for an out of bounds memory reference, determining whether a number of active objects for an application exceeds the threshold, and when the number of active objects exceeds the threshold, storing at least part of information about the active objects in an overflow table in a memory.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 16 illustrates an example modified malloc in a non-limiting embodiment.

DETAILED DESCRIPTION

Figure 1:
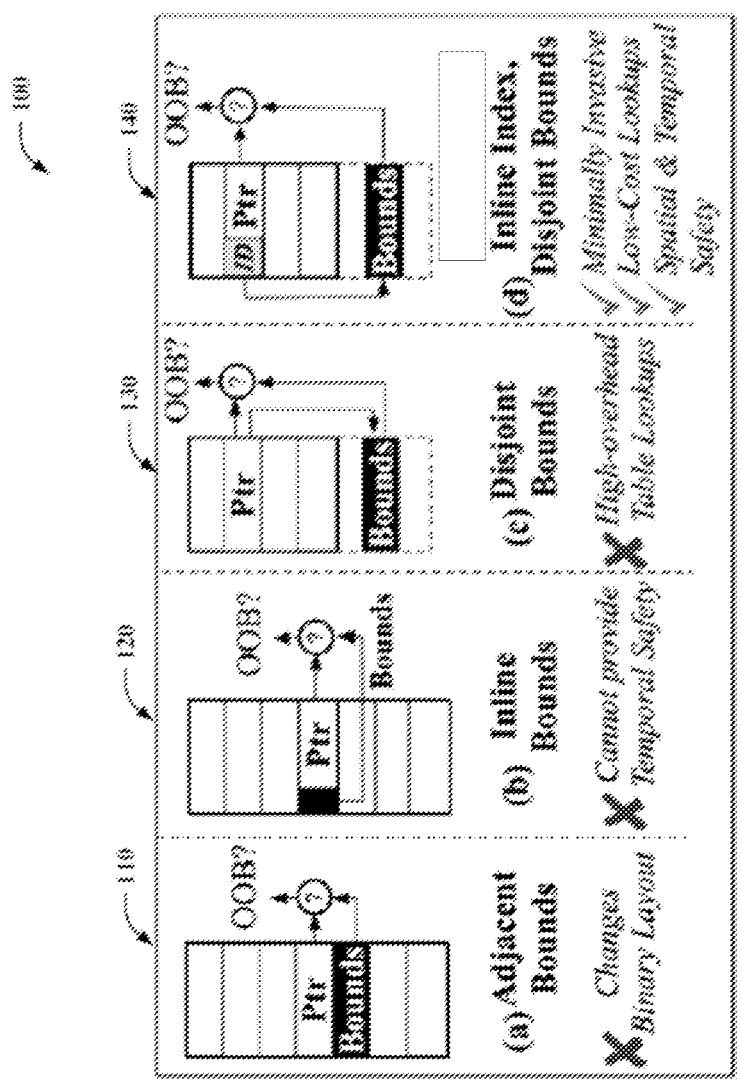
FIG. 1 illustrates bounds-checking based techniques.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures and embodiments shown can be modified or combined.

Applications written in memory-unsafe languages like C or C++, which utilize user-code to explicitly manage memory, are vulnerable to memory-safety errors like buffer-overflows, use-after-free, and others. Such errors have previously been exploited in numerous attacks, including high-profile attacks, such as the Morris worm and Heartbleed. Moreover, such errors are ranked by MITRE to be some of the most dangerous software bugs. A recent study by one technology company revealed that such errors continue to be the root cause of approximately 70% of the Common Vulnerabilities and Exposures (CVEs) identified in their production-software. In particular, errors specific to heap objects, including heap corruption, out-of-bounds accesses, and use-after-free, caused almost 50% of the CVEs in 2019.

Applications written in C/C++, where pointer manipulation is permissible without safety-checks, are prone to memory-errors where pointers dereference invalid memory regions. A spatial error (out-of-bounds access) can arise from pointer-arithmetic using unvalidated inputs that causes a buffer-pointer to access memory beyond the buffer-bounds. Similarly, a temporal error (e.g., use-after-free) can result from a read or write using a dangling pointer (a pointer to a freed object whose memory has been subsequently re-used). Memory leakage and corruption due to such errors has been exploited by attacks that break data-confidentiality, attempt privilege escalation, break system-integrity, and the like. Enforcing memory safety and preventing memory errors can facilitate preventing such attacks on production-software. Various techniques can be implemented to enforce memory safety and prevent memory errors.

Such techniques can also include bounds-checking based techniques that can provide precise enforcement of safe program behavior by tracking the object base and bounds and enforcing bounds-checks on all object accesses.

Memory references that are out of its bounds may cause serious security problems. Buffer Overflow vulnerabilities have been a problem for at least 30 years, e.g., Morris Internet Worm (1988). Buffer Overflow bugs have enabled many forms of attack including buffer-overflow based code injection, Return-Oriented Programming (ROP), "HeartBleed".

Existing methods abort program execution when an out-of-bounds reference is detected. The pros are that it is safe and good for debugging before release. However, the problems are that real applications may contain some unharmful out-of-bounds accesses. There can be software speculative loads for better performance, and minor bugs undetected before release.

Some work has been done to address buffer overflow attacks or the effects of buffer overflow attacks, e.g., "stack canaries", W XOR X memory pages, ASLR, "shadow stacks" & other approaches for protecting "control flow integrity").

Oracle Silicon Secured Memory (SSM) ("Colors" data in memory & prevents access by pointers that have "the wrong color". SSM has some limitations such as it only supports a very limited number of colors, and the granularity of protected data is 64 bytes.

It is important to check whether each memory reference, load or store, is within its memory boundary. One existing solution is INTEL's Memory Protection Extensions (MPX) mechanism. MPX introduced new instructions and hardware support for precise bounds checking. In memory, bounds information (BI) for each buffer is stored/retrieved with pointer value as key. In the core, pointer and its BI are in registers and mapping is maintained with extra instructions added by the compiler. Original computation and bounds protection operation share the same hardware resource. There are other methods that attempt to remove or reduce the memory safety vulnerabilities.

However, all these other solutions have one major problem of needing a plurality of instructions to be added and also costly implementation. As a result, the number of instructions may increase four or more times and the execution time can be increased to two or more times even when the bounds checking is turned off.

INTEL MPX protects buffers from out-of-bounds reference with precise bounds information (BI). MPX stores BI of buffers in a BI table through hashing of pointer values. The BI for a pointer is put into a general register when the pointer is loaded. The bookkeeping code is added to propagate BI in registers to its consumer: load and store instructions. Bounds checking instructions are inserted before load and store.

The additional problems with MPX are that the load of BI may not be used and there is two-level memory access for BI. Other conventional methods have problems leading to excessive load requests for BI, and BI is loaded and used in the same instruction, and so latency is not hidden.

There is a need to detect when references to array elements including pointer references to array elements (e.g., x[i], *p++, p→foo) are out of bounds).

There is a need to be able to do this without re-writing existing programs and without significant space or time overhead.

There is a need to have a mechanism that allows a program that makes out-of-bounds references to execute safely without interruption including, for example, to be able to fix the bug offline.

Another issue if "unused bits" in a pointer are used as an index into a table of bounds information is that array indexing, or pointer arithmetic may "overflow" into and corrupt an index value. In this case an out-of-bounds reference may not be detected if the index value is corrupted. Therefore, there is a need to solve this issue of corruption of the index value. As shown in the disclosure the use of BI registers and an overflow table solves this and other issues.

FIG. 1 illustrates bounds-checking based techniques.

As illustrated in FIG. 1, bounds-checking based techniques 100 can be grouped based on the location of their respective bounds-metadata. For example, bounds-checking based techniques 100 include an adjacent bounds group 110 that comprises fat-pointer based techniques like CCured and Cyclone. Fat-pointer based techniques can store the base and bounds metadata in separate words alongside the actual pointer value. Such storage of the base and bounds metadata facilitates allowing execution of a bounds-check to detect spatial errors when the actual pointer is dereferenced. Similarly, some instances of fat-pointer based techniques can replace pointers with 256-bit "capabilities" that can include the address, bounds-information, permission bits and other metadata required to facilitate enforcing fine-grain compartmentalization along with bounds-checking. Unfortunately, the adjacent bounds group 110 of bounds-checking based techniques generally involve changes to the source code and also changes to the binary layout impacting compatibility with library code.

An inline bounds group 120 of bounds-checking based techniques comprising Low-Fat-pointer based techniques provides another example. Low-Fat-pointer based techniques can encode the object-bounds inline within the pointer, without impacting binary layout. One instance of a low-fat-pointer based technique can use a compact floating-point format to store (the least significant bits of) the object base and bounds addresses in the top 18 bits of a 64-bit pointer. Other instances of low-fat-pointer based techniques can allocate objects in size-specific partitions of memory at a size-aligned base-address, to implicitly encode the base and bounds in the pointer-value. These instances of low-fat-pointer based techniques can track pointer-arithmetic (either in hardware or via explicit instructions inserted by compiler/instrumentation) to ensure that the pointer never crosses the inline-bounds. Unfortunately, the inline bounds group 120 of bounds-checking based techniques generally do not provide temporal safety, as the inserted checks that use the bounds within a dangling pointer continue to pass, even after the memory it references is reused.

A disjoint bounds group 130 of bounds-checking based techniques provides another example. Bounds-checking based techniques within the disjoint bounds group 130 can store bounds-metadata (per pointer or per object) in a disjoint table in shadow-memory to avoid changing the binary layout. The bounds-table is typically indexed using the pointer-value, as a linear table lookup or using a multi-level trie lookup. Such bounds-checking based techniques can detect spatial errors (some designs also detect temporal errors) by executing a bounds-check with a table-lookup (inserted by software or implicitly by hardware) on pointer-dereferences or on all pointer-arithmetic. Purely software-based techniques within the disjoint bounds group 130 that involve extra instructions to propagate bounds-metadata on pointer-arithmetic and for table-lookups can incur high performance overheads (e.g., ~50%-112% on average). Hardware-based techniques within the disjoint bounds group 130 can incur lower overheads compared to the software-based techniques by propagating bounds and executing checks using microcode or dedicated hardware. However, such hardware-based techniques can continue to incur moderate-to-high slowdown due to expensive table-lookups using the pointer-value, to access the bounds-metadata.

Unlike the various memory safety techniques discussed above, implementations of the disclosure involve a hardware-based bounds-checker that can precisely enforce object-bounds to prevent spatial errors. Embodiments of the hardware-based bounds-checking framework facilitate efficiently invalidating bounds for dangling pointers to detect temporal errors. For practical adoption, embodiments of this hardware-based bounds-checking framework comprise low performance overheads and avoid changes to the binary layout. To that end, implementations of the disclosure involve a bounds-metadata design that can associate a pointer with a unique inline identifier that can be used to index into a disjoint bounds table. One or more implementations of the disclosure comprise an inline index, disjoint bounds group 140 of bounds-checking based techniques.

Figure 2:
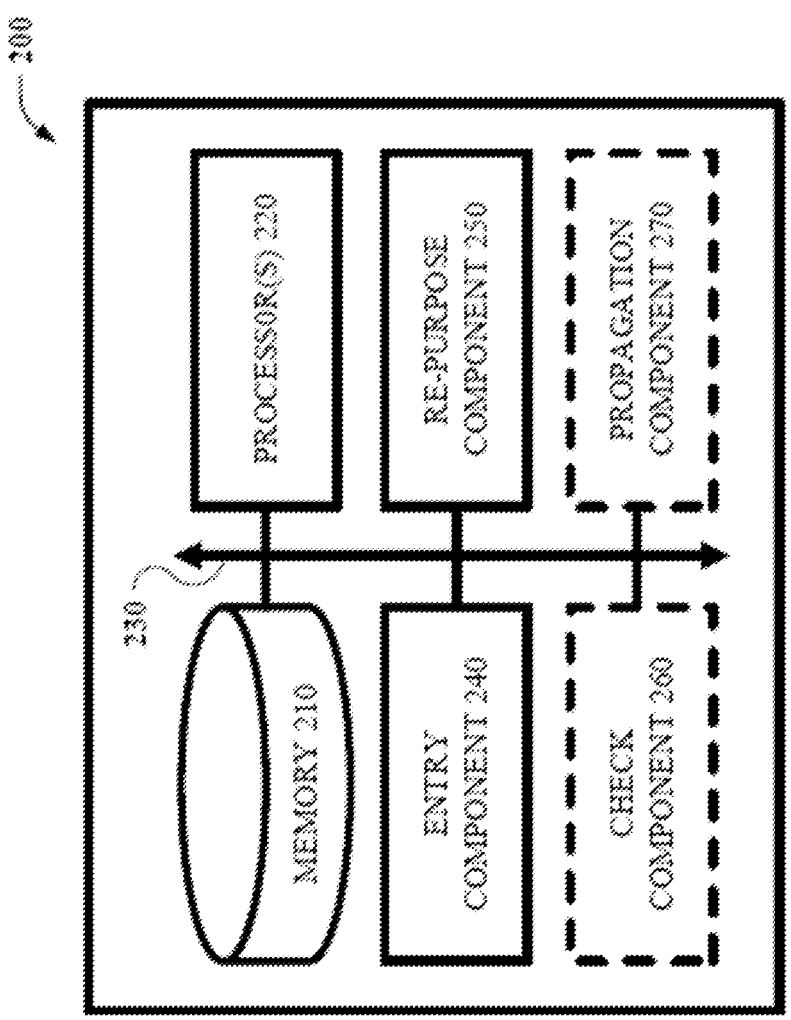
FIG. 2 illustrates a block diagram of an example, non-limiting system that can facilitate memory-error mitigation.

FIG. 2 illustrates a block diagram of an example, non-limiting system 200 that can facilitate memory-error mitigation for heap-objects, in accordance with one or more embodiments described herein. System 200 includes non-transitory computer readable storage medium (storage medium) 210 for storing computer-executable components and one or more processors 220 operably coupled via one or more communication busses 230 to storage medium 210 for executing the computer-executable components stored in storage medium 210. As shown in FIG. 2, the computer-executable components include: entry component 240 and re-purpose component 250.

Entry component 240 can allocate an entry in a table to store bounds-information when an object is allocated in memory. Re-purpose component 250 can re-purpose unused bits of an object address to store an index to the table entry. In an embodiment, re-purpose component 250 can utilize un-used bits in the object address to track a range of memory addresses that can be accessed.

The computer-executable components stored in storage medium 210 can further include check component 260. Check component 260 can execute bounds-checking in hardware on load and store instructions by using index bits in an address to access the bounds-information. The check component 260 can check array bounds. In an embodiment, check component 260 can determine if an array reference is in-bounds or out-of-bounds and mitigates occurrence of out-of-bounds array references.

The computer-executable components stored in storage medium 210 can further include propagation component 270. Propagation component 270 can automatically propagate the index when subsequent object addresses are derived via assignment statements or pointer arithmetic. The propagation component 270 can propagate extra information in unused bits when the object address is copied in an assignment statement. In an embodiment, propagation component 270 can propagate extra information in unused bits when the object address is passed as an argument in a function call. In an embodiment, propagation component 270 can propagate extra information in unused bits when the object address is used to compute an address. The functionality of the computer-executable components utilized by the embodiments will be covered in greater detail below.

The following disclosure presents a low-cost and minimally invasive framework for bounds-checking in hardware. The disclosed techniques involve a hardware-enabled pointer bounds-checking framework, for low-cost yet precise enforcement of memory safety for heap-objects. In an embodiment, the disclosed bounds-checking framework for heap-objects can be implemented using LLVM-instrumentation to replace malloc/free calls in programs with custom library-functions for maintaining bounds-information.

As discussed in greater detail below, implementations of the disclosed techniques facilitate mitigating memory-errors for heap-objects using precise enforcement of object-bounds on pointer-dereferences, to prevent out-of-bounds access and use-after-free errors. The disclosed techniques facilitate precise enforcement of such object-bounds while ensuring minimal performance impact and can be implemented with no changes to source-code or binary layout. Embodiments of the disclosed techniques can mitigate memory-errors for heap-objects by re-thinking hardware-enforced bounds-checking in a vertically integrated hardware/software (HW/SW) eco-system, with minimal changes to C/C++ memory-allocation functions, instruction set architecture (ISA), and hardware.

One aspect of the disclosed techniques involves re-purposing the "unused bits" in a pointer to check or keep track of a range of addresses that can be legitimately accessed via the pointer. In 64-bit architectures, object-pointers have unused bits, as they generally store virtual-addresses with 48-bits of information or less. The disclosed techniques can leverage these unused bits to: (a) allocate an entry in a bounds-table to store the bounds-information when an object is allocated; (b) re-purpose the unused bits (e.g., top-bits) of the object-pointer to store the index to the bounds-table entry; (c) automatically propagate the index when subsequent addresses are derived via assignment statements or pointer arithmetic; and/or (d) execute bounds-checking in hardware on load and store instructions by using the index bits in an address to access the appropriate bounds-information.

By leveraging these unused bits, the disclosed techniques facilitate a spatial and temporal safety solution for heap-objects, which prevents errors like heap out-of-bounds reads and writes, and use-after-free. In addition to mitigating heap-errors, one or more embodiments of the disclosed techniques are also generally applicable to memory safety for globals and stack-objects. Preventing such errors can be desirable because they make up almost 50% of the CVEs discussed above with respect to the technology company study and almost 60% of the memory-safety bugs detected.

Figure 3:
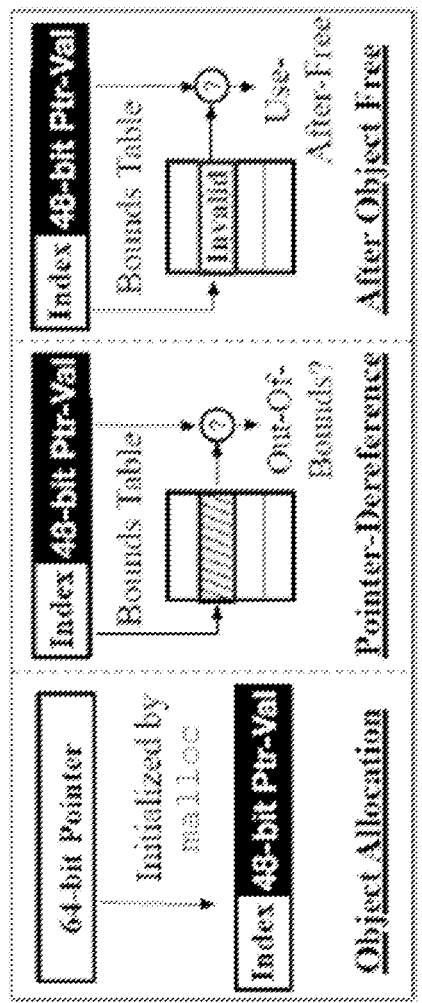
FIG. 3 illustrates an example, non-limiting high-level conceptual overview of protecting against memory-safety errors by re-using bits in 64-bit pointers that would be otherwise unused.
Figure 4:
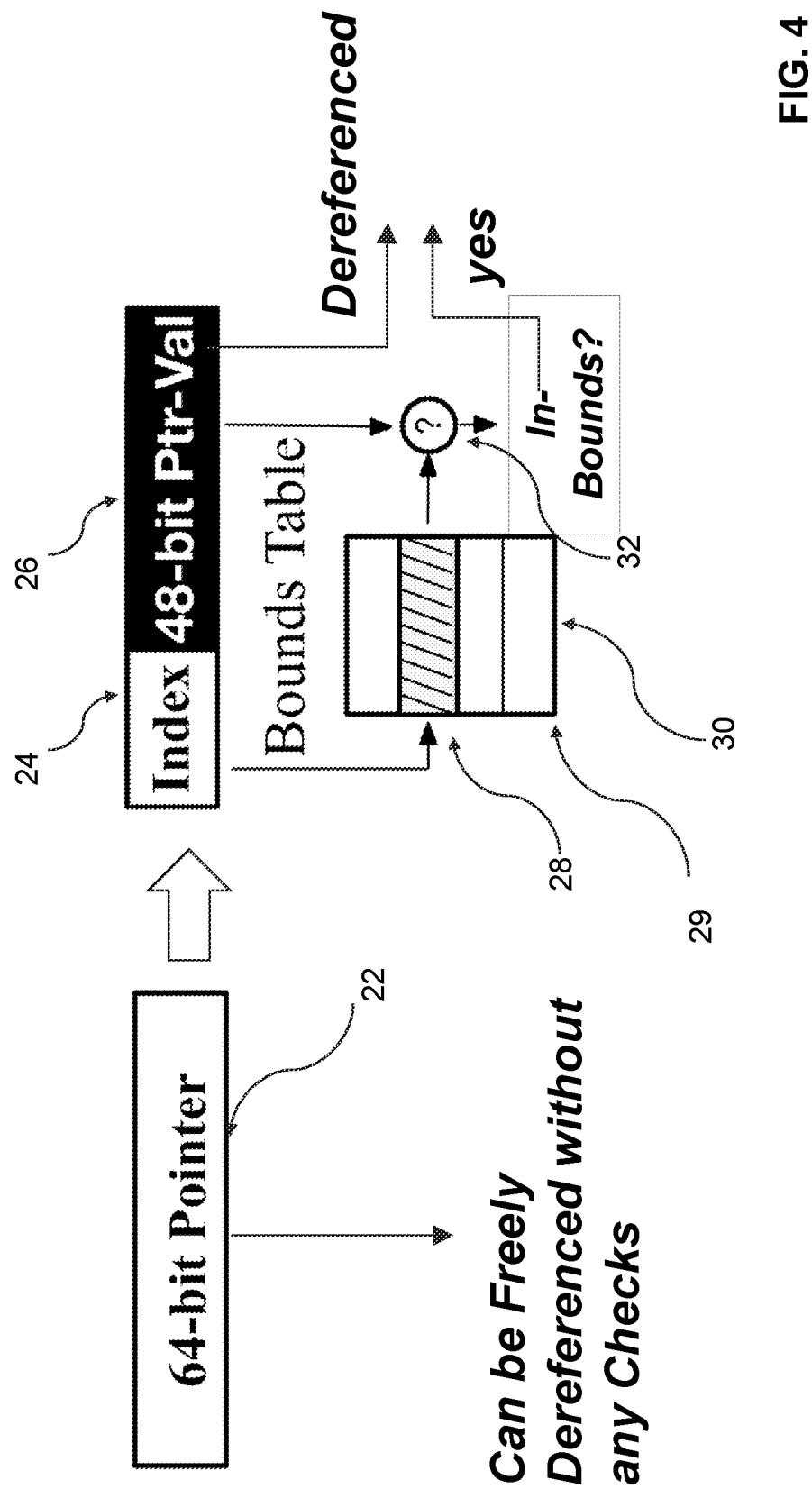
FIG. 4 illustrates an example, non-limiting high-level conceptual overview of protecting against out-of-bounds errors by re-using the unused bits in 64-bit pointers.

FIG. 3 illustrates an example, non-limiting high-level conceptual overview of protecting against memory-safety errors by re-using bits in 64-bit pointers that would be otherwise unused FIG. 4 illustrates further detail of a portion of FIG. 3 in an example, non-limiting high-level conceptual overview of protecting against out-of-bounds errors by re-using the unused bits in pointers.

Referring to FIG. 4 and FIG. 3, the disclosed techniques generally re-purpose unused bits (e.g., top-bits) of an object-pointer to store an index 24 of an entry 28 in a bounds-information table (BITable) 30 containing bounds-metadata corresponding to the object-pointer. The BITable 30 is a per-process BITable. In one or more embodiments, the disclosed techniques intercept C-library memory allocation functions to allocate an entry in a BITable 30 on a malloc and invalidate the entry on a free.

The BITable (bounds information table) 30 can facilitate checking or tracking the bounds-metadata for each object on the heap. Such metadata can be used to enforce bounds-checks on pointer-dereference via bounds-checking operations in load/store execution in hardware. Using an index 24 of a bounds-table entry 28 in the unused bits (e.g., top-bits) of an object-pointer, the disclosed techniques detect out-of-bounds accesses during an object's lifetime. FIG. 3 also illustrates that after an object is freed the disclosed techniques detect use-after-free errors using the index 24 in a dangling-pointer that points to an invalid bounds-table entry.

Of note, the disclosed techniques can facilitate leaving the binary layout unchanged, unlike in prior fat-pointer based approaches. Additionally, the disclosed techniques do not incur any overheads for propagation of the index (which can happen "automatically" via program semantics) when one pointer is assigned to another or passed in a function call, or used to compute another address in array indexing or pointer arithmetic. In contrast, existing solutions can require extra instructions or micro-ops to propagate pointer-metadata. In an embodiment, propagation of the index happens "automatically" without any "extra" instructions being fetched or executed.

Moreover, the performance impact of the actual bounds-checking can be minimal for, at least, two reasons. First, since all the addresses associated with a given buffer can have the same index, the index bits and the bounds information for an address will often be available in an on-chip Bounds Information (BI) cache.

Simulations of example implementations show a greater than 98% hit rate for bounds information using an 8 KB on-chip BI cache. Second, the bounds-checking for a load or store operation can be done in parallel with the address translation of the load or store operation, often without adding any extra delay to the load or store instruction.

The index and the bounds information table can also be used to detect "double-free" and other invalid free errors. Bounds information registers paired with general purpose registers can also be used to facilitate bounds checking.

Lastly, as the location of the bounds-information (which can be determined by the index 24) is independent of the pointer-value 26, the disclosed techniques can also maintain invalid-bounds status for dangling pointers even after the freed memory is reused. The disclosed techniques can also provide temporal safety at no extra cost, unlike existing hardware-based bounds-checking solutions where the bounds-metadata location is generally linked to pointer-value.

The disclosed bounds-checking framework for heap-objects can involve a threat model comprising one or more assumptions. One example assumption can be that a program may have heap memory-safety bugs like out-of-bounds access, use-after-free, double-free, and invalid-free. Another example assumption is that an adversary can pass unverified inputs to the program in an attempt to exploit such memory bugs. Another example assumption is that an adversary cannot modify the user-program code to introduce bugs, or directly access or tamper bounds-metadata. Another example assumption is that the memory-allocator functions that can be used by the disclosed framework to manage the bounds-metadata are trustworthy and bug-free.

One aspect of the disclosed bounds-checking framework is to store the bounds-metadata of an object throughout its lifetime in a BITable 30 within a virtual address space of a program. In an embodiment, the BITable 30 is a per-process BITable 30. Another aspect of the disclosed bounds-checking framework is to enforce hardware-based bounds-checks on all object accesses at runtime.

Therefore, as mentioned above, "unused bits" can be used in, for example, a 64-bit pointer 22 to store an index 24 into a "bounds information table" 30 so that when the hardware uses the pointer 22 in a load or store operation, the hardware can determine if the pointer 22 reference is in-bounds, or out-of-bounds, or some other form of invalid reference.

Figure 5:
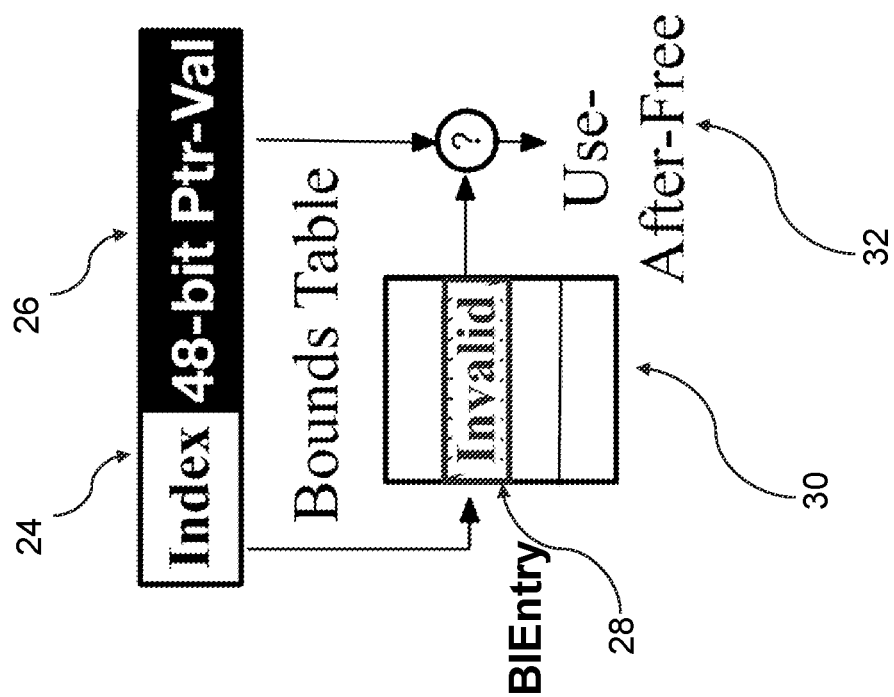
FIG. 5 illustrates protecting against use of an object after it has been freed (a "use-after-free" error) using the disclosed techniques.

FIG. 5 illustrates protecting against use of an object after it has been freed (a "use-after-free" error) using the disclosed techniques.

As seen in FIG. 5 also illustrates that after an object is freed the disclosed techniques detect use-after-free errors 32 using the index 24 in a dangling-pointer that points to an invalid bounds-table entry 28.

Figure 6:
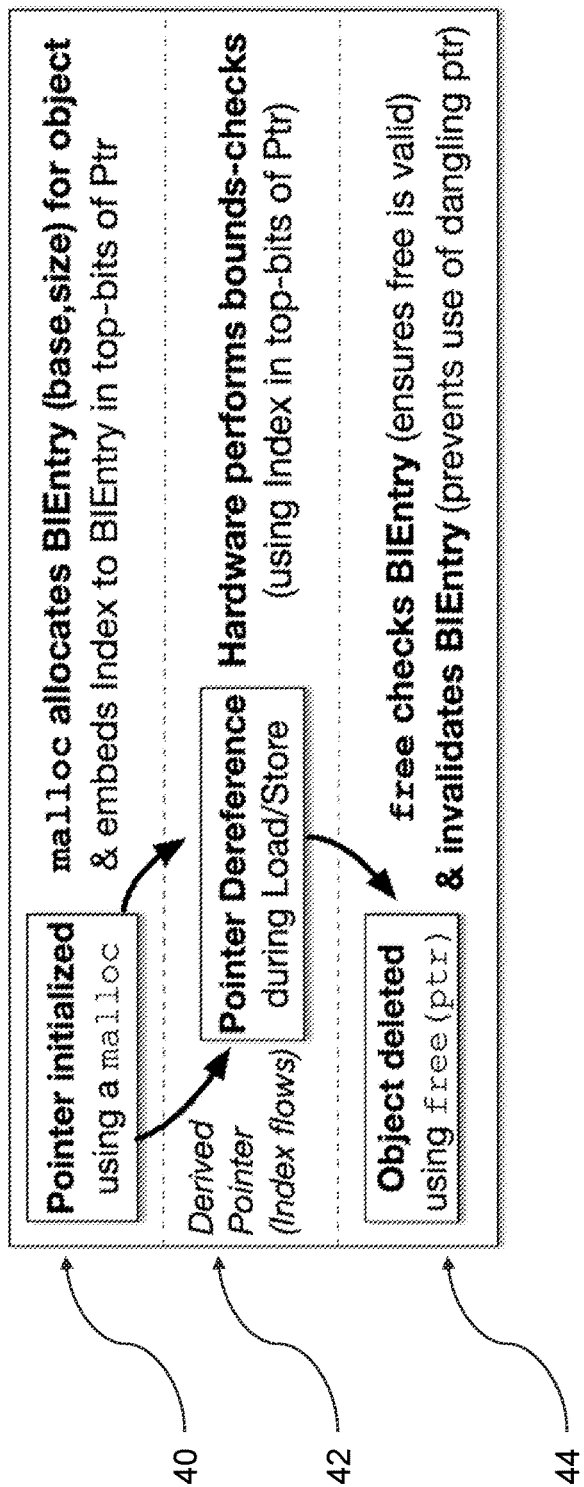
FIG. 6 illustrates an example, non-limiting high-level conceptual overview of a life-cycle of a pointer during program runtime.

FIG. 6 illustrates an example, non-limiting high-level conceptual overview of a life-cycle of a pointer during program runtime.

As illustrated in FIG. 6, an entry can be created (BIEntry) in the BI Table when an object is created. The BIEntry can be used to store a base-address and a size of the object. In another embodiment, a BIEntry can be used to store the addresses that correspond to the upper and lower bounds of the object. An index of the corresponding entry of the BITable can be embedded within unused bits of the pointer. As used herein, the term "index bits" refers to unused bits of a pointer in which an index of a corresponding entry of a BITable is embedded. For simplicity of implementation, the following disclosure describes the top 24-bits of the pointer being usable as index bits. However, embodiments of the disclosure are not limited to the index bits being either contiguous or the top 24-bits of the pointer. In an embodiment, the index bits are non-contiguous. In an embodiment, one or more bits of a pointer precede the index bits in the pointer. FIG. 6 further illustrates that hardware can use the index within the top-bits to access the corresponding BIEntry and perform a bounds-check to detect out-of-bounds accesses when the pointer is dereferenced.

Moreover, as illustrated in FIG. 6, the corresponding BIEntry can be invalidated when an object is freed. Invalidating corresponding BIEntries can facilitate detection of temporal errors if dangling pointers to such freed objects are used subsequently.

The pointer is initialized using a malloc 40. The malloc allocates BIEntry (base, size) for the object and embeds the index to the BIEntry in top-bits of the pointer Ptr. There is pointer Dereferencing during a load/store operation 42. The hardware performs bound-checks using the index in the top-bits of the pointer Ptr. The object is deleted using the free (Ptr) 44. Free checks the BIEntry to ensure the free is valid, and invalidates the BIEntry to prevent use of a dangling pointer.

Figure 7:
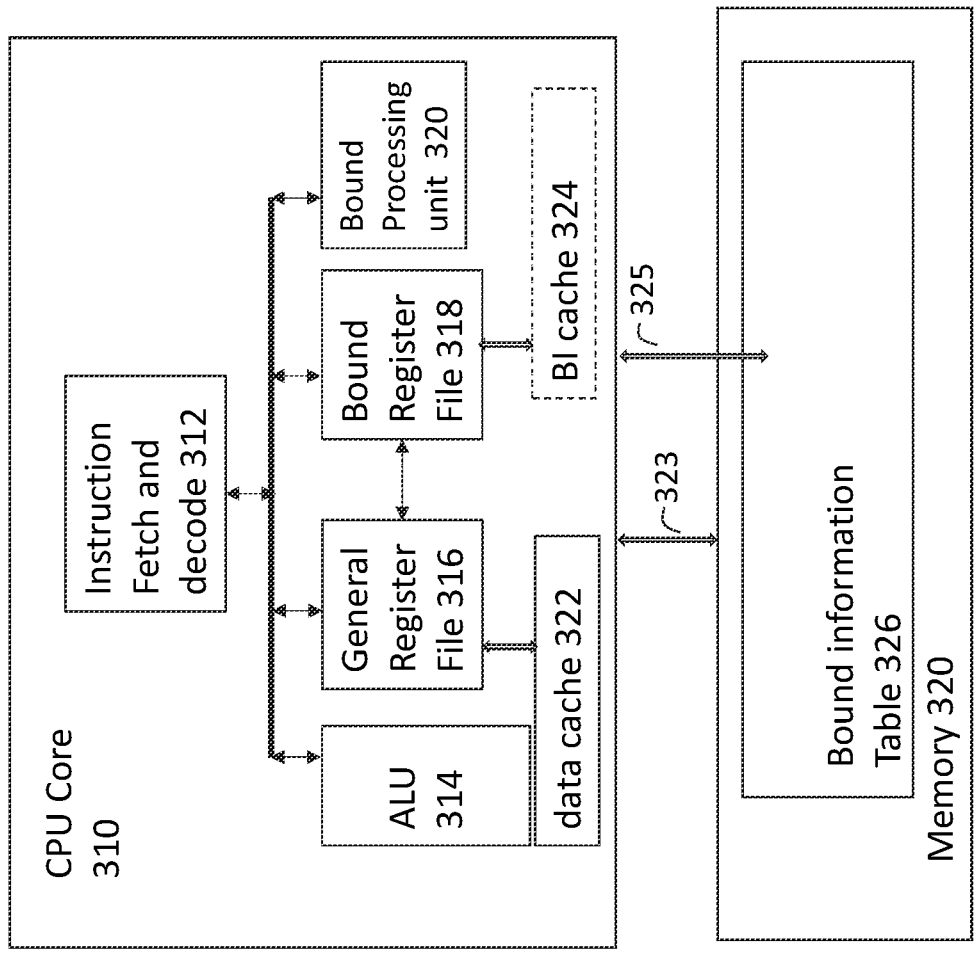
FIG. 7 illustrates an example system in which a General Purpose Register (GPR) has a corresponding Bounds Information (BI) Register.

FIG. 7 illustrates an example system in which a General Purpose Register (GPR) has a corresponding Bounds Information (BI) Register.

When an address in a GPR is used in a load or store instruction, the corresponding BI register is used in bounds-checking.

When the contents of one GPR is copied to another register or is used to compute another address (e.g., p+1 or a[14]), the BI register for the 1st GPR is automatically copied to the BI register for the 2nd GPR.

This is a non-limiting example, and other configurations can be made. The system includes a CPU (central processing unit) core 310 and a memory 320. The CPU Core 310 includes an instruction fetch and decode 312, ALU (arithmetic logic unit) 314, general file register 316, bound register file 318, bound processing unit 320. The general file register communicates with the data cache 322, while the bound register file 318 is linked with the bound information (BI) cache 324. The bound information (or bounds-information) cache 324 can be added to limit any slowdown from accesses to the bound information table 326 in memory 320.

Figure 8:
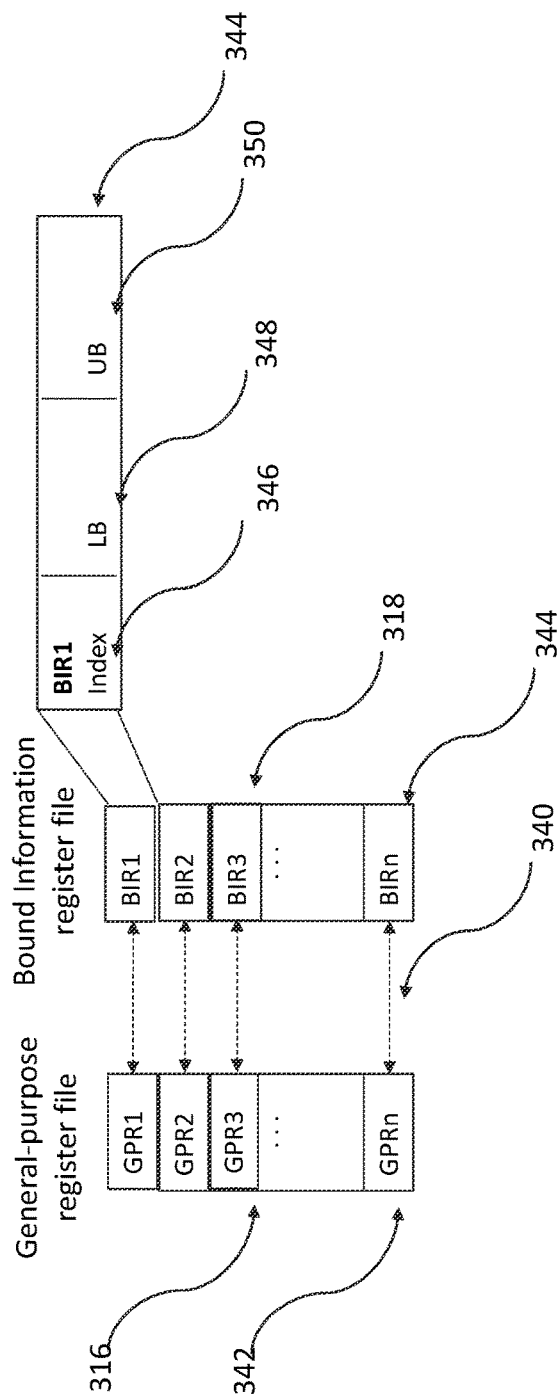
FIG. 8 illustrates a bound information register file and a general-purpose register file.

FIG. 8 illustrates a bound information register file and a general-purpose register file of an embodiment.

The BI Register File 318 is further detailed as follows with the help of FIG. 7. There is a one-to-one mapping (virtually) 340 between registers in the general-purpose register file 316 and registers in the BI register file 318. The BIRi (or BIRn shown, where n is an integer) 344 entry holds the bound information for a pointer in general-purpose register information GPRi (or GPRn shown, where n is an integer) 342 with identity mapping.

The BI registers 318 are not directly used in the instructions. The BI register in register file 318 is accessed implicitly with the index of the general-purpose register in register file 316 specified in an instruction.

Some methods have advantages over prior schemes such as INTEL MPX, such as "Automatic" propagation of bounds "index" information without "extra" instructions, e.g., when a pointer is assigned to another, passed in a function call or used to compute another address in array indexing or pointer arithmetic, bounds information flows "automatically".

In one embodiment each BI register 318 has three fields: (index 346, LB (lower bound) 348, UB (upper bound) 350). As seen in the example, the upper bound (UB) 350 is the right most cell 350. The Index 346 is described in the next paragraph.

The "unused bits" in a pointer are re-purposed to check or keep track of a range of addresses that can be accessed via the pointer. For example, in 64-bit architectures, object-pointers have unused bits, as they generally store virtual-addresses with 48-bits of information or less. The disclosed techniques can leverage these unused bits to: (a) allocate an entry in a bounds-table to store the bounds-information when an object is allocated; (b) re-purpose the unused bits (e.g., top-bits) of the object-pointer to store the index to the bounds-table entry; (c) automatically propagate the index when subsequent addresses are derived via assignment statements or pointer arithmetic; and/or (d) execute bounds-checking in hardware on load and store instructions by using the index bits in an address to access the appropriate bounds-information.

Since all of the addresses associated with a given buffer have the same "index", the bounds information for an address is often available in an on-chip "Bounds Information" cache. However, since the number of "unused bits" may be limited and the number of "live objects" may exceed the number that can be referenced in the unused bits, there is the introduction of an "Overflow Table" as seen in the following embodiments.

In an embodiment, there is disclosed a technique that leverages the use of an overflow table to extend memory safety support to larger applications.

Hardware Support for Memory Safety with an Overflow Table

Figure 9:
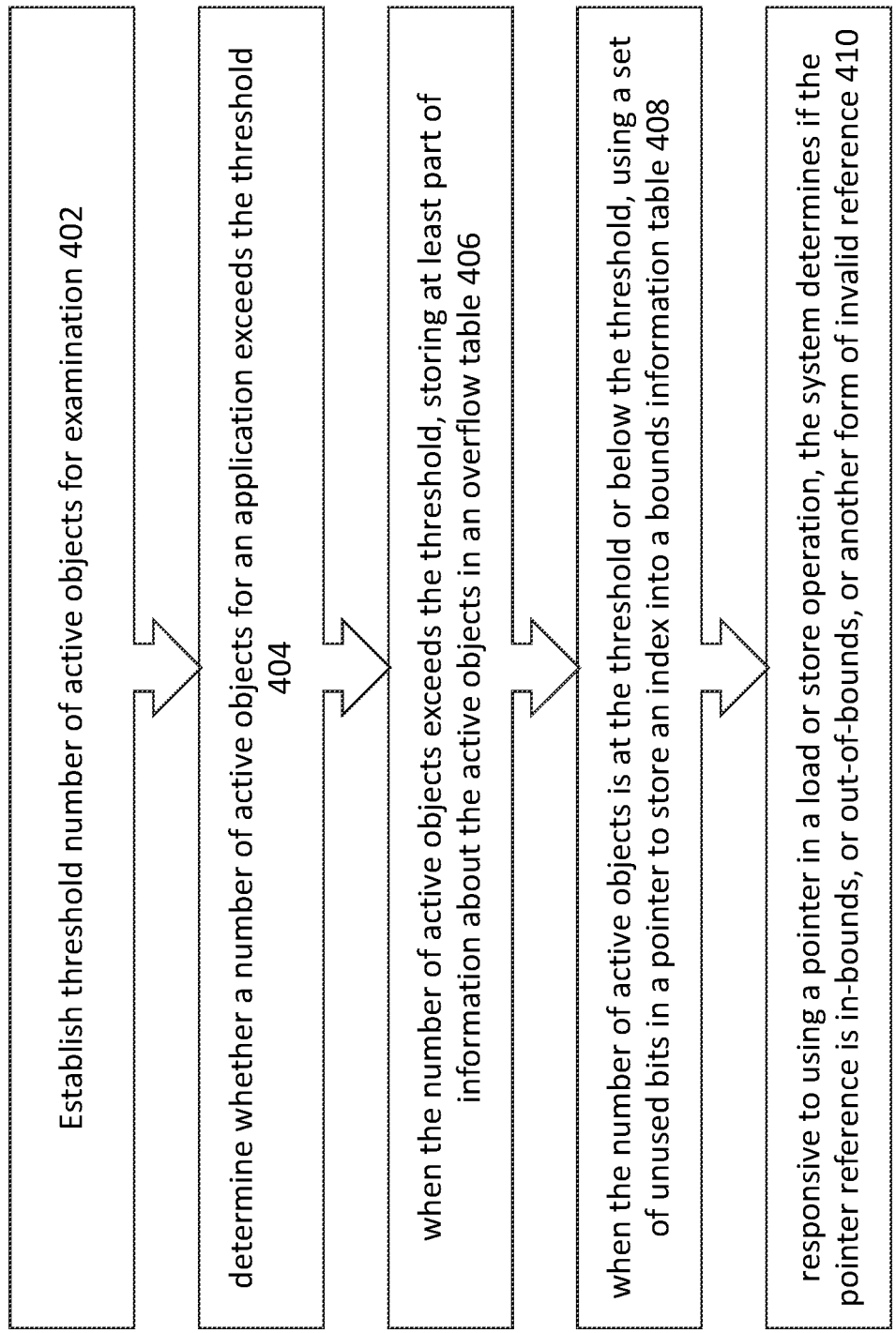
FIG. 9 illustrates an example, non-limiting method of providing support for memory safety with an overflow table, in accordance with one or more embodiments described herein.

FIG. 9 illustrates an example, non-limiting method of providing support for memory safety with an overflow table, in accordance with one or more embodiments described herein.

The Overflow Table can be used when the number of live objects exceeds ~$2^n$ where n (an integer) is the number of unused/index bits in an address/pointer.

However, one can leverage "Bounds Information" Registers and a new CPU instruction in order to minimize the need to store information in and find information in the Overflow Table.

For example, in an embodiment the system establishes a threshold number, e.g., n, where n is an integer, for the number of a objects that can be monitored for out of bounds references by a first mechanism 402. The system determines whether a number of active objects of an application, i.e., the number of objects that have been allocated and not freed, exceeds the threshold n 404. Then, when the number of active objects exceeds the threshold n, storing at least part of information about the active objects in an overflow table 406. In an embodiment, when the number of active objects is at or below the threshold, using a set of unused bits in a pointer to store an index into a bounds information table 408.

In an embodiment, responsive to using a pointer in a load or store operation, the system determines if the pointer reference is in-bounds, or out-of-bounds, or another form of invalid reference 410.

Figure 10:
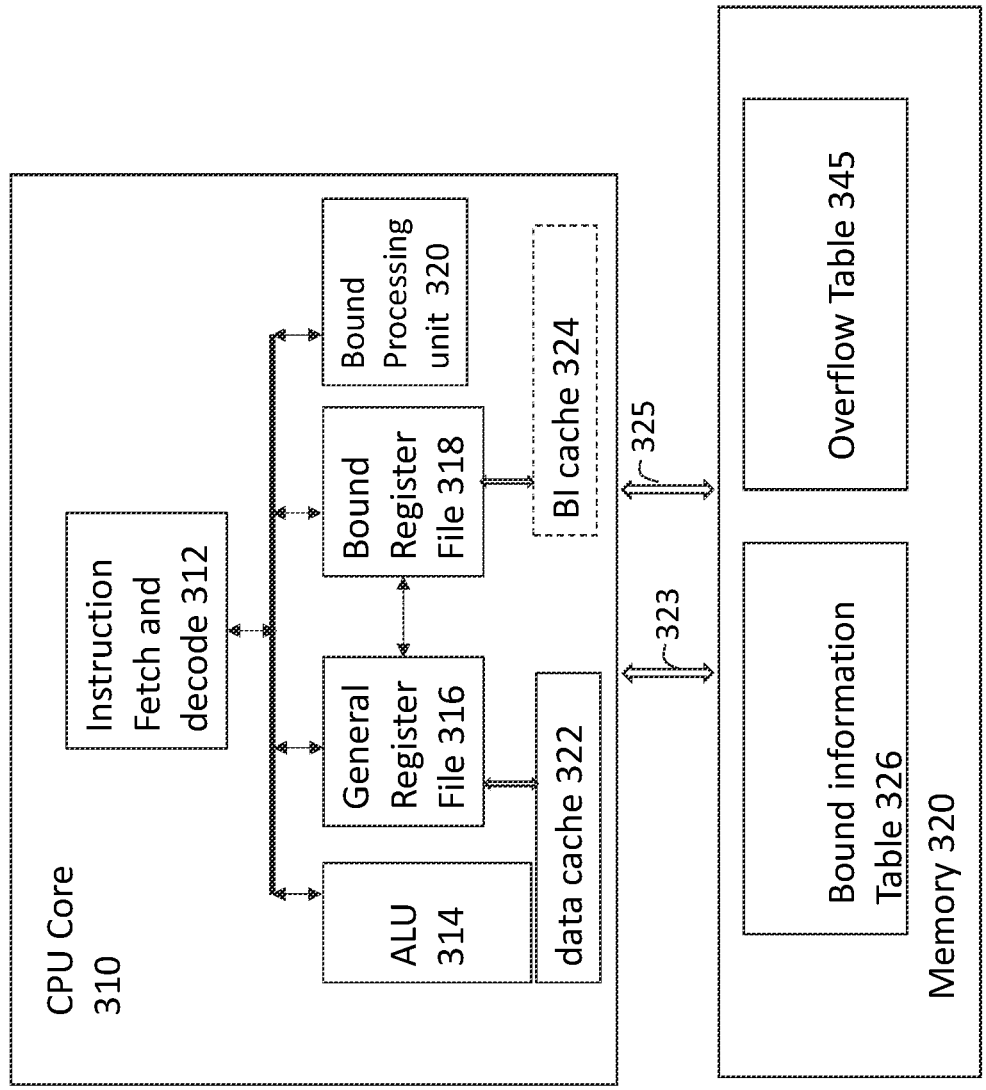
FIG. 10 illustrates an example, non-limiting system of providing support for memory safety with an overflow table, in accordance with one or more embodiments described herein.

FIG. 10 illustrates an example, non-limiting system of providing support for memory safety with an overflow table, in accordance with one or more embodiments described herein.

For example, the overflow table 345 can be in a memory 320 that communicates with the CPU Core 310. The overflow table 345 can be located in other locations, including, for example, the CPU Core 310 or a separate memory, via a network, etc. The overflow table 345 can also be a hash table as detailed further below.

In an embodiment, if the number of allocated objects that have not been freed exceeds the number that can be represented in the index bits in a pointer, the "overflow table" (e.g., overflow table 345) can be used.

Figure 11:
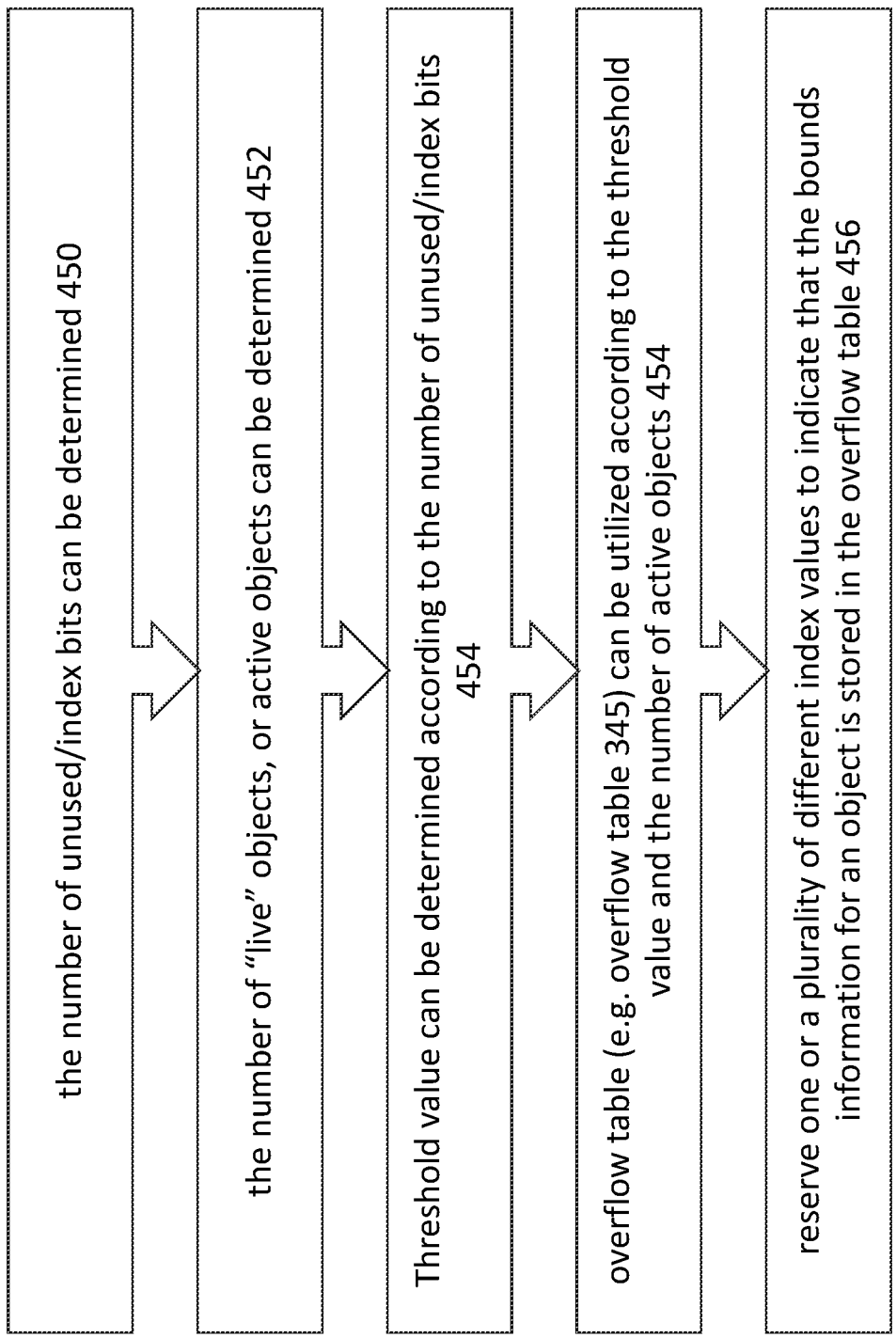
FIG. 11 an example, non-limiting method of providing support for memory safety with an overflow table, in accordance with one or more embodiments described herein.

FIG. 11 illustrates an example, non-limiting method of providing support for memory safety with an overflow table, in accordance with one or more embodiments described herein.

For example, in an embodiment, the number of unused/index bits can be determined 450. This number can be specified by a program for example and the number can vary between programs. The number of "live" or active objects, the number of objects that have been allocated and not yet freed) can be determined 452. A threshold value can be determined according to the number of unused/index bits 454. The overflow table (e.g., overflow table 345) can be utilized according to the threshold value and the number of active objects. When the number of active objects exceeds the threshold value, the overflow table is utilized 454. The system can reserve one or a plurality of different index values to indicate that the bounds information for an object is stored in the overflow table 456.

For example, if the number of unused/index bits is 24, the overflow table 345 can be used when the number of "live" or active objects is greater than $2^{24}$-2.

In an embodiment, the system can reserve one index value, e.g., an index consisting of all 1's, say, to indicate that the bounds information for an object is stored in the overflow table. Moreover, in an embodiment the system can reserve the all 0's index value for backwards compatibility, so that a mechanism of the embodiment does not impact the loads and stores of ordinary integers for example.

As discussed previously, malloc's and free's are used to add entries to and delete entries from the bounds information table 326. But if the number of currently allocated objects exceeds the number that can be represented in the unused bits of a pointer, malloc and free can add entries to and delete entries from an overflow table.

Figure 12:
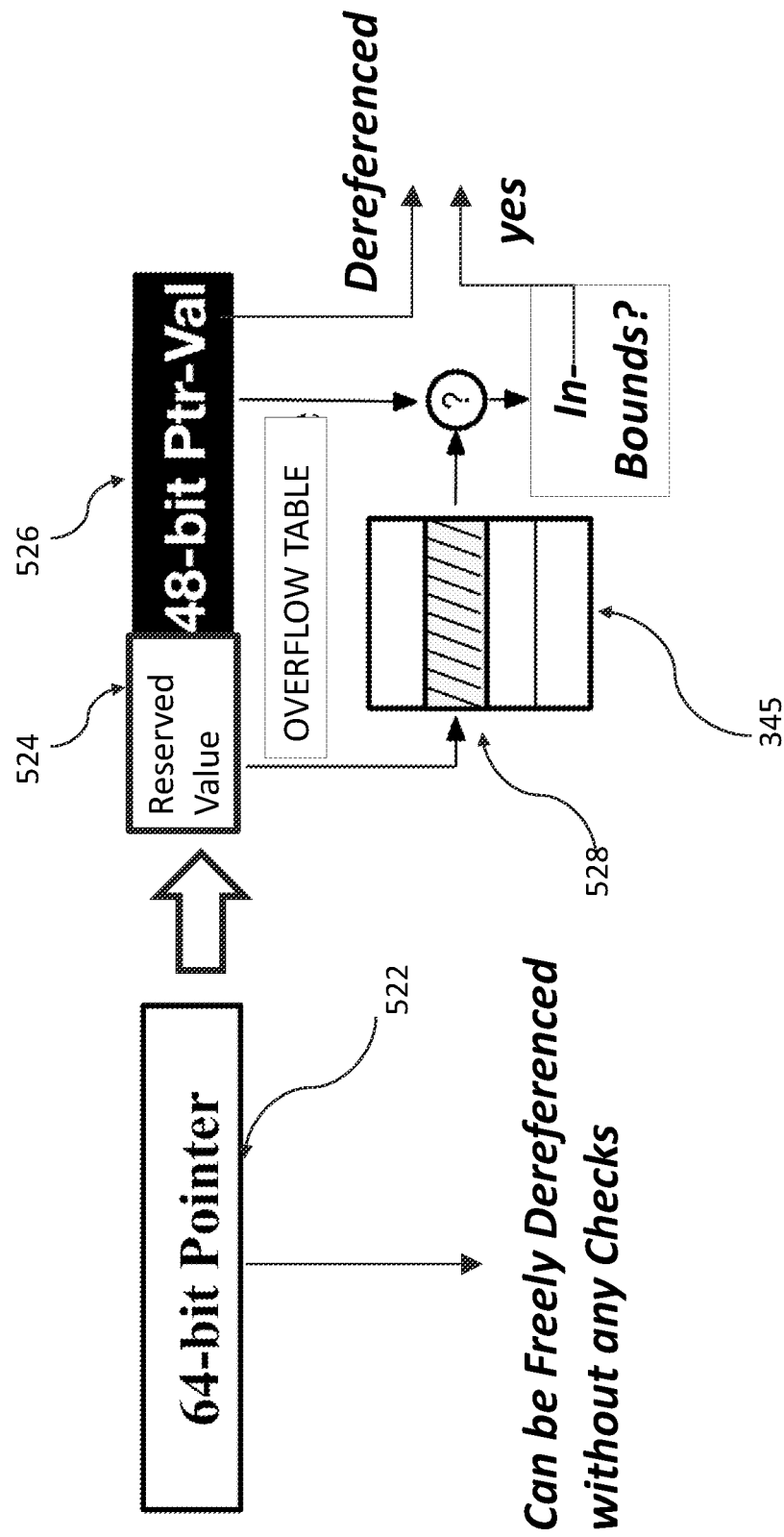
FIG. 12 illustrates an overflow table of a non-limiting example embodiment.

FIG. 12 illustrates an overflow table of a non-limiting example embodiment. In an embodiment, malloc and free can also cause entries 528 to be added to or deleted from the overflow table 345.

As long as the number of active objects is less than or equal to the number that can be represented by the unused bits in a pointer 522, everything works as previously described. But if a malloc would cause the number of active objects to exceed that limit, the overflow table 345 may be used for the newly malloc-ed object. In this case, the address of the newly malloc-ed object will have the reserved value 524 (e.g. the all 1's value) in its index bits and the bounds information for the newly malloc-ed object may be stored in the overflow table 345 as discussed in more detail below.

Note that the index bits for objects that are stored in the overflow table 345 all have the same reserved value 524 (e.g., the all 1's value). So bounds information for these objects cannot be obtained simply by using the index bits to index into a bound-information table 326. The overflow table 345 can take the form of a hash table and the bound information for an object can be found by computing a hash value and searching a hash bucket corresponding to that value. But to minimize the impact of accessing entries in the overflow table 345, in one embodiment, bounds information will normally be accessed from the BI registers and the overflow 345 table will only be used when a pointer 522 needs to be stored into or retrieved from memory as discussed in more detail below.

If the return-value from malloc is returned through a register, for example, "gpr0", then in an embodiment the bounds information of the newly allocated object can be 'returned' in bi0, the bounds information register corresponding to gpr0.

If gpr0 is copied to another register, or if gpr0 is used to compute another address (e.g. in an expression like p+1 or a[14]) the bounds information for gpr0 will automatically be copied to the bounds information register for the result register and if the result register is used as an address in a load or store instruction, bounds checking will use the corresponding bounds information register.

The above processing can be done without storing any information in the overflow table 345. In fact, information for the newly malloc-ed object might never be stored in the overflow table 345.

Storing pointers in and loading pointers from memory is shown further in the following.

Figure 13:
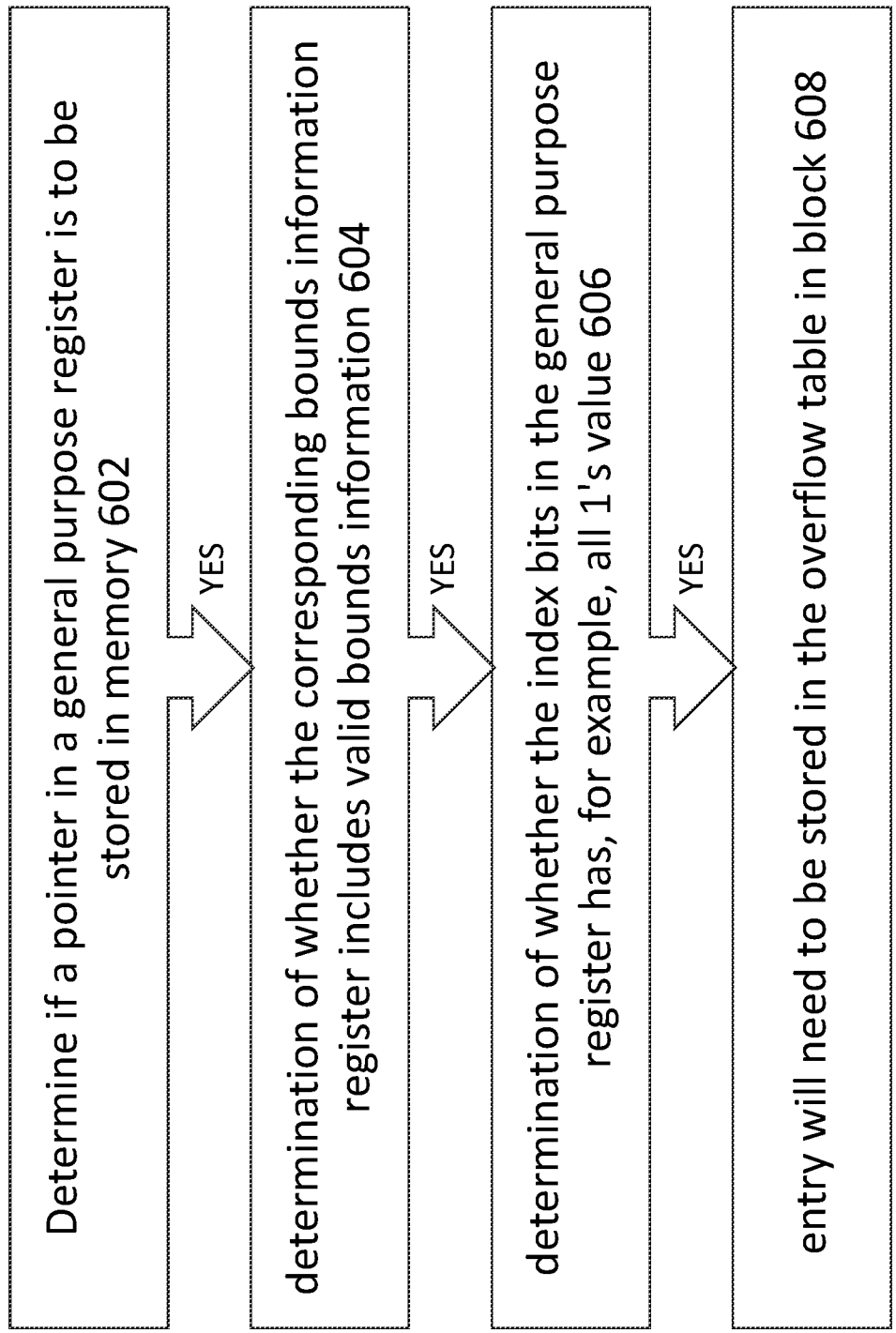
FIG. 13 illustrates another non-limiting example embodiment of the overflow table.

FIG. 13 illustrates another non-limiting example embodiment of the overflow table. Specifically, the storing of the pointer in memory is shown in the following. When a pointer with the "all 1's" index value is stored in memory, the bounds information associated with that pointer needs to be stored in the overflow table With reference to FIG. 13 and referring back to FIGS. 8, 10 and 12 shows the following example implementation. There is determination of whether a pointer in a general purpose register 342 is to be stored in memory 320 in block 602. There is also a determination of whether the corresponding bounds information register 344 includes valid bounds information in block 604. There is determination of whether the index bits in the general purpose register 342 have the reserved value (e.g. the all 1's value) in block 606.

If a general purpose register 342 is stored in memory 320 and if the corresponding bounds information register 344 contains valid bounds information, and if the index bits in the general purpose register 342 has, for example, the all 1's value, then the bounds information associated with that pointer needs to be stored in the overflow table 345.

For example, if register gpr3 of the general purpose register file 316 is to be stored in memory 320 at address "x", and if bi3 of bounds information register file 318 contains valid bounds information and if the index bits in register gpr3 contain the all 1's value then an entry will be stored in the overflow table 345 for address "x" with the bounds information in bi3.

The overflow table 345 may be a hash table and the location of the entry in the table may be based on a hash of address "x". Alternatively, another kind of data structure could be used such as a b-tree.

Figure 14:
FIG. 14 illustrates another non-limiting embodiment of the overflow table with a hash table.

FIG. 14 illustrates another non-limiting embodiment of the overflow table with a hash table. Specifically, the loading of the pointer from memory is shown. The determinations shown below can be done in any order or run in parallel.

When a pointer with the "all 1's" index value is loaded from memory, a determination is made in step 610 that the bounds information needs to be loaded from the overflow table 345.

If a pointer is loaded into register gpr5, say, from address "x" and if the index bits in the pointer contain the all 1's index, then bi5 will be loaded with the bounds information associated with address "x" in the overflow table 345 in block 612.

As discussed above, the location of this entry in the hash table may be based on a hash of address "x" as seen in block 612.

On the other hand, if no bounds information associated with address x is found in the overflow table, if the buffer has been freed for example (614), bounds information register bi5 will be loaded with a special value indicating "no-valid-bounds-information" in block 616.

If a pointer with the "no-valid-bounds-information" value in its bounds information register 344 is used in a load or store 618, an "invalid-pointer" exception will be generated 620. Moreover, if a pointer with this value in its bounds information register 344 is stored in memory 320 in block 622, no value is stored in the overflow table 345 in block 624.

Figure 15:
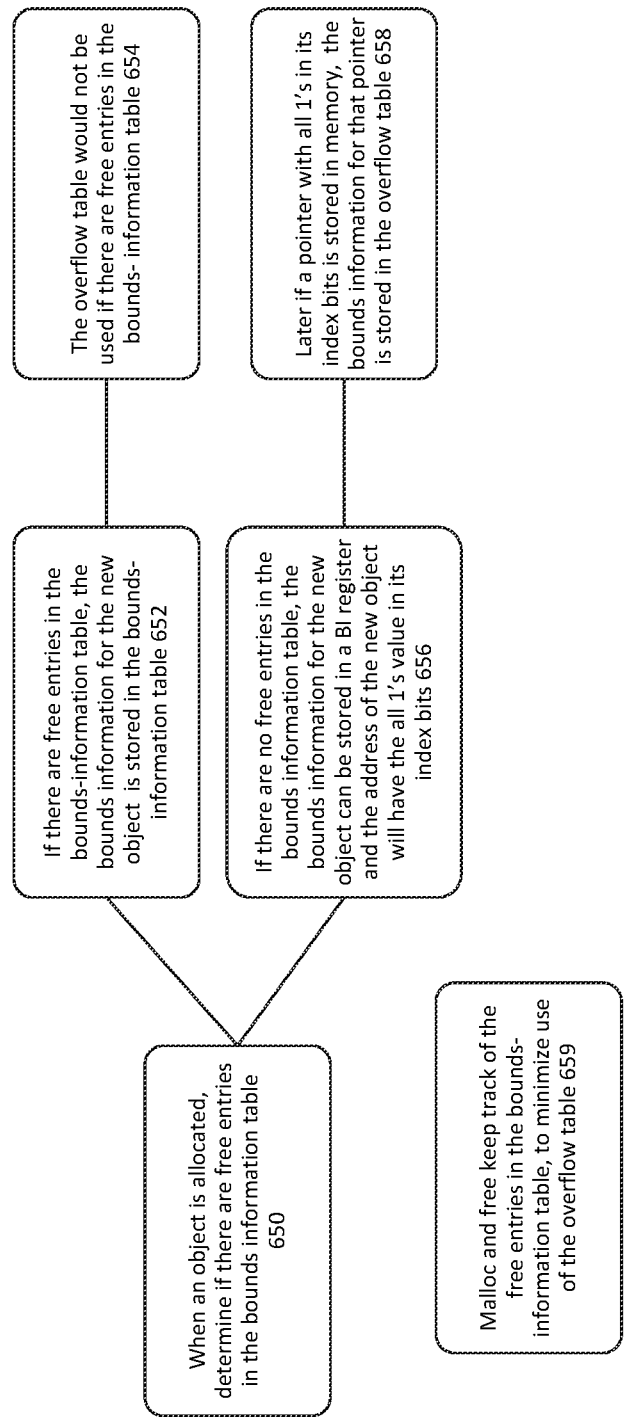
FIG. 15 illustrates a non-limiting embodiment of the overflow table.

FIG. 15 illustrates the use of an overflow table in an example embodiment. When a new object is allocated, the system determines if there are free entries in the bounds information table 650. The bounds information of the newly allocated object is stored in the bounds information table if there is room in the bounds information table 652. If there is no room in the bounds information table, the bounds information will be stored in bi registers 656 and may be stored in the overflow table 658.

When a buffer is free-ed, the free routine may need to do some additional cleanup to free entries in the overflow table 345 and to delete bounds information in bounds information bi registers 318.

Since multiple bounds information bi registers 318 may contain bounds information for a given buffer as discussed above, when the buffer is freed the bounds information in each of these bounds information bi registers 318 should be set to "no-valid-bounds-information".

Moreover, since there may be multiple entries in the overflow table 345 for a given buffer, a free for a buffer should free all of the entries for that buffer. To facilitate this, the entries for a given buffer should be linked together in a list and the list for a given buffer should be find-able via a hash of its bound information. For example, if gpr3 is a register that contains a pointer with the all 1's index, and if gpr5 contains a pointer that has been derived from gpr3, and if both gpr3 and gpr5 are stored in memory, e.g., at addresses x and y respectively, the overflow table will contain bounds information entries for both x and y and both entries need to be deleted when the referenced object is freed.

When entries in the original Bounds Information table are freed, they are added to a free list to minimize use of the overflow table 659.

Malloc and free would also keep track of the free entries in the bounds information table 326 in blocks 652 and 659 so that malloc can re-use entries that have been free-ed so that the all 1's index value and the overflow table 345 would only be used when there are no free entries in the bounds information table 345 in block 656.

In an alternative embodiment, when there are no free entries in the bounds information table 345 in block 656, malloc would store an entry in the overflow table 345 and not store bounds information in a bounds information bi register 318 in block 656.

In this alternate embodiment of block 656 and 658, when a pointer 522 is used in a load or store, the load or store instruction may have to fetch bounds information from the overflow table 345.

The previous embodiment, illustrated in blocks 656 and 658, can result in fewer entries in the overflow table 345 and better performance but it does require a new instruction so that malloc can store bounds information in a bounds information bi register 318. The non-limiting alternative example embodiment does not require this new instruction, but it may use more entries in the overflow table 345 and may result in more overhead in storing information to and accessing information from the overflow table 345.

Pointer de-referencing is shown as follows. When a pointer is dereferenced, the corresponding bounds information bounds information bi register 318 is used for bounds-checking. If the reference is out-of-bounds or if the value of the bounds information bi register 318 is "no-valid-bounds-information", then an "invalid-pointer" reference exception is generated.

FIG. 16 illustrates an example modified malloc in a non-limiting embodiment.

As seen in FIG. 16, if there are free entries in the Bound Information (BI) table, a set of allocation and store commands are performed 570. The set of commands would be, for example, allocate a new entry in the bound information BI table, then store the bounds information for the new object in the new BI table entry. The system would then store the index of the new table entry in the index field of pointer "p". Then the system would store the bounds information for the new object in bound information register bi0.

Else, the store command of store the "all 1's" index in the index field of pointer p and store the bounds information for the new object in bound information register bi0 is performed and the bounds information is not stored in memory, unless and until a pointer derived from pointer p is stored in memory 572.

Figure 17:
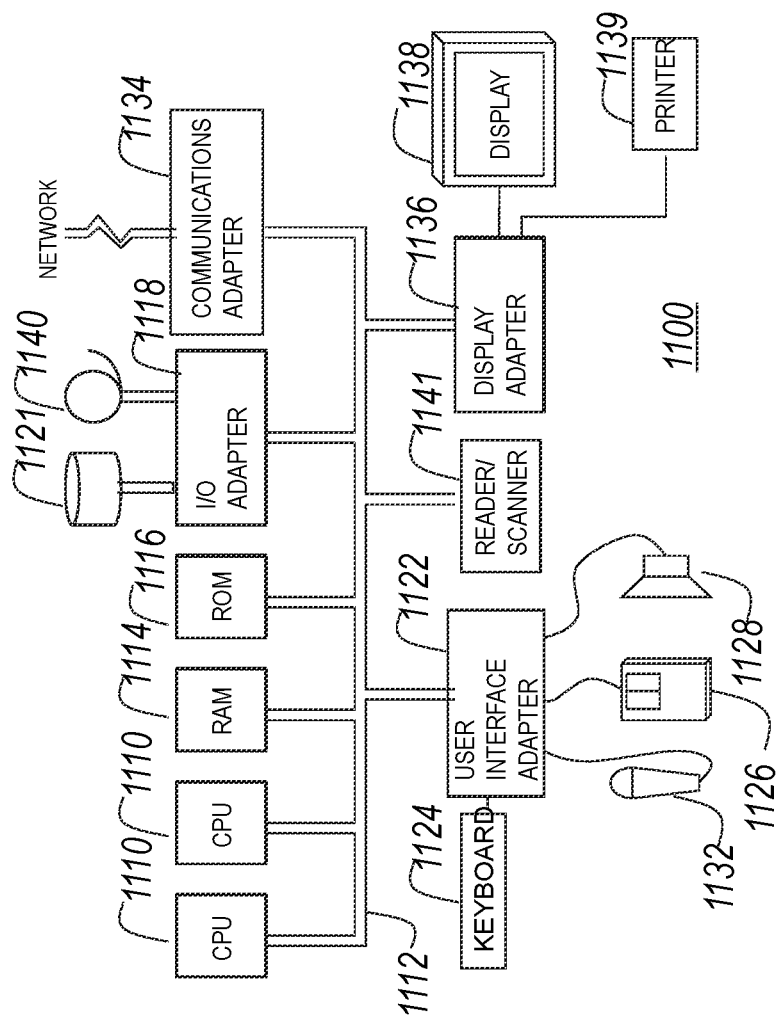
FIG. 17 illustrates an exemplary hardware/information handling system for incorporating the example embodiments therein.

FIG. 17 illustrates another hardware configuration of the system, where there is an information handling/computer system 1100 in accordance with the disclosed embodiments and which preferably has at least one processor or central processing unit (CPU) 1110 that can implement the techniques of the invention. For example, system 300 of FIG. 10 can be configured in the infrastructure such as FIG. 17.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122

(for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the embodiments is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media, such as a flash memory or optical storage diskette, directly or indirectly accessible by the CPU.

Whether contained in the flash memory, the optical disk, the computer/CPU, or elsewhere, the instructions may be stored on a variety of machine-readable data storage media.

Therefore, the example embodiments may be a system, a method, and/or a computer program product. The computer program product may include a computer readable storage medium (or media) having computer readable program instructions thereon for causing a processor to carry out aspects of the example embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the example embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the example embodiments.

Aspects of the example embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 18:
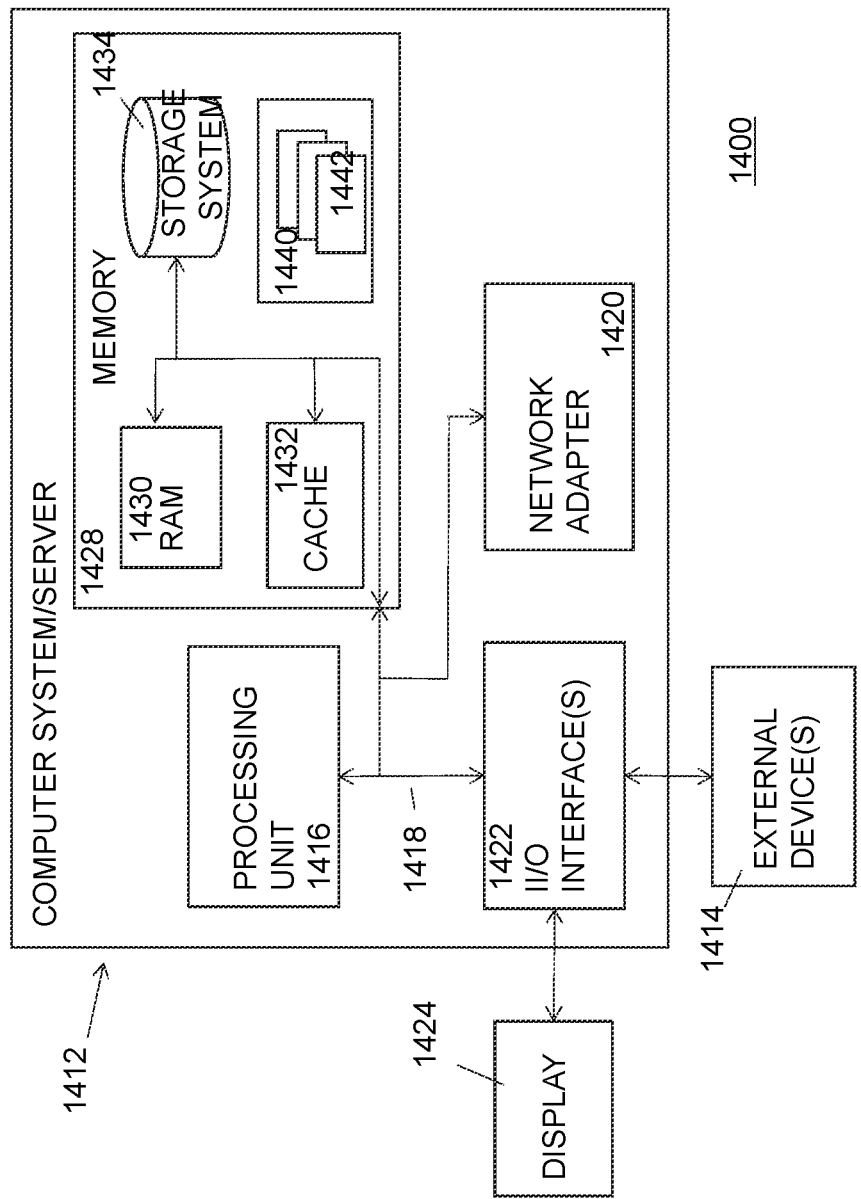
FIG. 18 depicts a cloud computing node according to an example embodiment.

Referring now to FIG. 18, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove. For example, system 300 of FIG. 10 can be implemented in a cloud infrastructure such as FIG. 18.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of protecting from out of bounds memory references, the method comprising:
   establishing a threshold number of active objects for examination for an out of bounds memory reference;
   determining whether a number of active objects for an application exceeds the threshold; and
   when the number of active objects exceeds the threshold, storing at least part of information about the active objects in an overflow table in a memory.

2. The method according to claim 1, further comprising when the number of active objects is at the threshold or below the threshold, using a set of unused bits in a pointer to store an index into a bounds information table in the memory.

3. The method according to claim 1, further comprising responsive to using a pointer in a load or store operation, determining if the pointer reference is an in-bounds memory reference, or out-of-bounds memory reference, or another form of invalid memory reference.

4. The method according to claim 1, further comprising linking in the overflow table entries that correspond to the same buffer.

5. The method according to claim 1, further comprising when the number of active objects is at the threshold or below the threshold, storing an index into a bounds information table in the memory,
   wherein the overflow table comprises a hash table, and
   wherein the overflow table is separate from the bounds information table in the memory.

6. The method according to claim 1, further comprising:
   when the number of active objects is at the threshold or below the threshold, using a set of unused bits in a pointer to store an index; and
   responsive to using the pointer in a load or store operation, determining if the pointer reference is an in-bounds memory reference, or out-of-bounds memory reference, or another form of invalid memory reference.

7. The method of claim 1, further comprising:
   determining whether a pointer reference is an in-bounds memory reference, or out-of-bounds memory reference, or another form of invalid memory reference,
   wherein index bits for objects that are stored in the overflow table all have a same reserved value.

8. A system for protecting from out of bounds memory references, comprising:
   a memory storing computer instructions; and
   a processor configured to execute the computer instructions to:
      establish a threshold number of active objects for examination for an out of bounds memory reference;
      determine whether a number of active objects for an application exceeds the threshold; and
      when the number of active objects exceeds the threshold, store at least part of information about the active objects in an overflow table in a memory.

9. The system according to claim 8, further comprising the processor configured to execute the computer instructions to when the number of active objects is at the threshold or below the threshold, use a set of unused bits in a pointer to store an index into a bounds information table in the memory.

10. The system according to claim 8, further comprising the processor configured to execute the computer instructions to responsive to using a pointer in a load or store operation, determine if the pointer reference is an in-bounds memory reference, or out-of-bounds memory reference, or another form of invalid memory reference.

11. The system according to claim 8, further comprising the processor configured to execute the computer instructions to link in the overflow table entries that correspond to the same buffer.

12. The system according to claim 8, further comprising the processor configured to execute the computer instructions to when the number of active objects is at the threshold or below the threshold, store an index into a bounds information table in the memory,
   wherein the overflow table comprises a hash table, and
   wherein the overflow table is separate from the bounds information table in the memory.

13. The system according to claim 8, further comprising the processor configured to execute the computer instructions to:
   when the number of active objects is at the threshold or below the threshold, use a set of unused bits in a pointer to store an index; and
   responsive to using the pointer in a load or store operation, determine if the pointer reference is an in-bounds memory reference, or out-of-bounds memory reference, or another form of invalid memory reference.

14. The system according to claim 8, further comprising the processor configured to execute the computer instructions to determine whether the pointer reference is an in-bounds memory reference, or out-of-bounds memory reference, or another form of invalid memory reference,
   wherein index bits for objects that are stored in the overflow table all have a same reserved value.

15. A computer program product comprising a computer readable storage medium having program instructions embodied therewith, the program instructions readable and executable by a computer to cause the computer to perform a method for protecting from bounds memory references, comprising:

establishing a threshold number of active objects for examination for an out of bounds memory reference;

determining whether a number of active objects for an application exceeds the threshold; and when the number of active objects exceeds the threshold, storing at least part of information about the active objects in an overflow table in a memory.

16. The computer program product according to claim 15, further comprising when the number of active objects is at the threshold or below the threshold, using a set of unused bits in a pointer to store an index into a bounds information table in the memory.

17. The computer program product according to claim 15, further comprising responsive to using a pointer in a load or store operation, determining if the pointer reference is an in-bounds memory reference, or out-of-bounds memory reference, or another form of invalid memory reference.

18. The computer program product according to claim 15, further comprising linking in the overflow table entries that correspond to a single buffer.

19. The computer program product according to claim 15, further comprising when the number of active objects is at the threshold or below the threshold, storing an index into a bounds information table in the memory, wherein the overflow table comprises a hash table, and wherein the overflow table is separate from the bounds information table in the memory.

20. The computer program product according to claim 15, further comprising:

when the number of active objects is at the threshold or below the threshold, using a set of unused bits in a pointer to store an index; and responsive to using the pointer in a load or store operation, determining if the pointer reference is an in-bounds memory reference, or out-of-bounds memory reference, or another form of invalid memory reference, and wherein index bits for objects that are stored in the overflow table all have a same reserved value.

* * * * *